United States Patent [19]

Marraccini et al.

[11] Patent Number: 4,568,493
[45] Date of Patent: Feb. 4, 1986

[54] SILANIC PHTALOCYANINIC DYES AND COMPOSITE PIGMENTS

[75] Inventors: Antonio Marraccini, Dormelletto; Filippo M. Carlini, Novara; Antonio Pasquale, Novara; Giorgio Maranzana, Novara, all of Italy

[73] Assignee: Montedison, S.p.A., Milan, Italy

[21] Appl. No.: 590,338

[22] Filed: Mar. 16, 1984

[30] Foreign Application Priority Data

Mar. 22, 1983 [IT]  Italy ................................ 20199 A/83

[51] Int. Cl.$^4$ ............................................. C09B 47/04
[52] U.S. Cl. ............................................. 260/245.74
[58] Field of Search ................................... 260/245.74

[56] References Cited

U.S. PATENT DOCUMENTS 3,963,744  6/1976  Smith .............................. 260/245.74
4,033,980  7/1977  Meininger ....................... 260/245.74

Primary Examiner—Paul R. Michl
Attorney, Agent, or Firm—Morgan, Finnegan, Pine, Foley & Lee

[57] ABSTRACT

There are described silanic phtalocyaninic dyes; composite pigments obtainable by grafting said dyes on an inorganic substrate, and, processes for preparing said dyes and said composite pigments.

The dyes are of the following general formula:

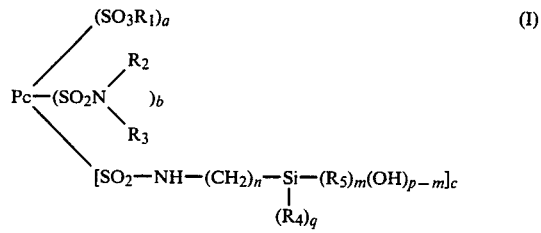

wherein: Pc is the residue of the phtalocyanine which may be metallized with a metal selected from the group consisting of Co, Ni and Cu; $R_1$ is selected from the group consisting of H and alkaline metals; $R_2$ and $R_3$, equal or different, are selected from the group consisting of H, alkyls having up to 4 carbon atoms, cycloalkyls and aryls; $R_4$ is selected from the group consisting of an alkyl with from $C_1$ to $C_4$ and phenyl; $R_5$ is an alcoxyl $C_1$-$C_4$; n is 3, 4 or 5; q is 0,1; p and m are such integers that when q is 0 p is 3 and m is 0, 1, 2 or 3, and when q is 1, p is 2 and m is 0, 1, 2; a and c are numbers in the range of 1 to 3 and b is a number in the range of 0 to 2, chosen in such a way that the sum $a+b+c \leq 4$; and wherein each of the four benzenic rings of the phtalocyanine is bound to only one single sulphonic group ($-SO_3R_1$) or sulphonamidic group.

The composite pigments obtained from above mentioned dyes find their use in varnishes, air-drying or stoving enamels, in the pigmentation of plastic materials as well as in printing inks.

9 Claims, No Drawings

SILANIC PHTALOCYANINIC DYES AND COMPOSITE PIGMENTS

DESCRIPTION OF INVENTION

The present invention concerns a new type of phtalocyaninic dyes containing, in a chemical combination, at least one silanic group. The present invention also includes novel composite pigments formed by grafting said dyes onto a solid inorganic substrate. Such composite pigments are nonflocculating and stable to crystallization.

BACKGROUND OF INVENTION

It is well-known that phtalocyaninic pigments, in particular those based on copper phtalocyanine, in the metastable forms named $\alpha, \gamma, \delta, \epsilon$, present in the drawback of being crystallizing in the presence of solvents, particularly aromatic solvents, and that, moreover, the above cited metastable forms have the tendency to convert to the stable form $\beta$, a phenomenon that is accompanied by a change in tone, by an increase in the particle size of the pigment resulting in the attendant disadvantage of a considerable decrease in dyeing power.

The crystals of the $\beta$ form, in their turn under the action of heat or of the crystallization solvents, tend to grow, with consequent loss of dyeing power, modification of the pigmentary properties and increase of the viscosity of the medium into which they are incorporated.

A further serious drawback of such phtalocyaninic pigments, in particular of those metallized with copper, is their tendency to flocculate, with consequent poor dripping properties of the corresponding dispersions, or separation or settling of the pigment from varnishes containing two or more pigments, in particular from non-aqueous dispersion systems of a weak viscosity such as those for varnishes and inks.

OBJECTS OF THE INVENTION

An object of this invention is to provide silanic phtalocyaninic dyes suited for providing "composite silanic pigments" free of the above listed drawbacks. In the context of the present invention the term or expression "composite silanic pigment" means a pigmentary material consisting of an association of phtalocyaninic dyes containing at least one silanic group with a solid inorganic substrate or support.

The above mentioned association of phtalocyaninic dye, containing at least one silanic group, or silanic phtalocyaninic dye for short, with a solid substrate, results in imparting to said silanic dye a pigmentary nature.

Such association is achieved through the formation of chemical bonds (graftings), between the silanic portion of the dye and the inorganic substrate.

Another object of the present invention is that of providing silanic phtalocyaninic dyes suited for providing pigments with excellent characteristics, in particular that be non-flocculating and be stable under crystallization.

Still other objects may be seen in the preparation of said dyes and pigments by means of simple and unexpensive methods.

GENERAL DESCRIPTION OF THE INVENTION

It has been found that the objects of this invention may be achieved by the preparation of silanic phtalocyaninic dyes and by the composite silanic pigments derivable by grafting said dyes on the surface of an inorganic substrate.

More particularly, the phtalocyaninic dyes of this invention contain at least one silanic group of the formula:

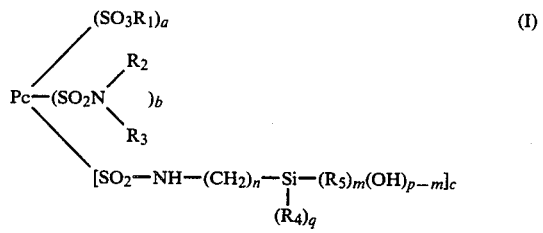

(I)

wherein Pc is the residue of phtalocyanine which may be metallized with a metal; $R_1$ is selected from the group consisting of a hydrogen atom and an alkaline metal; $R_2$ and $R_3$, which may be equal or different are selected from the group consisting of H, alkyls having up to 4 carbon atoms, cycloalkyls and aryls; $R_4$ is selected from the group consisting of a $C_1$-$C_4$ alkyl and phenyl; $R_5$ is a $C_1$-$C_4$ alcoxyl; n is 3, 4 or 5; q is 0,1; p and m are such integers that when q is 0 p is 3 and m is 0, 1, 2, 3, and that when q is 1 p is 2 and m is 0, 1, 2; a and c are numbers in the range of 1 to 3 and b is a number in the range of 0 to 2, chosen in such a way that the sum of $a+b+c$ will be $\leq 4$; and wherein each of the four benzenic rings of the phtalocyanine is bound to only one single sulphonic ($-SO_3R_1$) or sulphonamidic group.

The phtalocyaninic residue is preferably metallized with a metal selected from the group consisting of Co, Ni and Cu.

The dyes of this invention are prepared by means of a process comprising reacting a chloride of a phtalocyaninesulphonic acid of the formula:

(II)

wherein Pc has the meaning given to it previously; f is a number in the range of 0 to 2; d is a number in the range of 2 to 4; f and d being chosen in such a way that their sum be lower or equal to 4, with a compound of the formula:

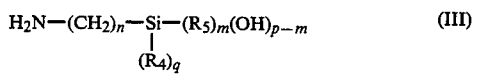

(III)

wherein n, $R_4$, $R_5$, q, m and p have each the meaning previously given to them, and possibly with a compound of the formula:

(IV)

wherein R₂ and R₃ have the meaning previously indicated, according to a molar ratio (II):(III) in the range of 1 to 4, and possibly according to a molar ratio between compound (IV) and compound (II) in the range of 1 to 10, in a reaction medium consisting of water and/or organic solvents, at a temperature of the reaction medium, for 1 to 12 hours.

The reaction may possibly be carried out in the presence of a hydrochloric acid acceptor compound such as $Na_2CO_3$, $NaHCO_3$, triethylamine and pyridine.

The possible $-SO_2Cl$ groups present at the end of the reaction may be successively hydrolized to free solphonic groups or they may be salified. The reaction may be carried out in an aqueous suspension, in organic solvents or in mixtures of water and water-mixable organic solvents. Examples of water-mixable solvents which may be used are dimethylformamide, dioxane and acetonitrile. Examples of suitable water-immisable solvents are xylene and dichlorobenzene.

The chlorinated derivatives from phtalocyaninosulphonic acids of formula (II) may be prepared according to substantially conventional methods, for instance, by treatment of phtalocyanine with chlorosulphonic acid or by chlorination of the phtalocyanine-sulphonic acid, possibly in the presence of thionyl or sulphoryl chloride or of phosphorous pentachloride or trichloride.

Particularly suitable as silanic compounds of formula (III) are those derived from amino-alcoxy-silanes, such as for instance γ-aminopropyl-trietoxysilane, δ-aminobutyl-trietoxysilane, δ-aminobutyl-phenyl-dietoxysilane, γ-aminopropyl-methyl-dietoxy-silane. The aforementioned amino-alcoxy silanes are known compounds, available on the market.

They may, however, also be prepared, according to conventional techniques, for instance, by reaction of the corresponding chloro-alcoxy-silanes with aliphatic amines.

Examples of amines of formula (IV) which may be used are ammonia, methylamine, ethylamine, propylamine, benxylamine, aniline, morpholine and cyclohexylamine.

The silanic phtaloxyaninic dyes of formula (I) possess a fair solubility in organic and aqueous solvents. They have a satisfactory dyeing power and are suitable for the dyeing of natural fibres such as wool and cotton, according to techniques commonly used for acid or substantive dyes, giving dyeings of a pure tone, and showing characteristics of good overall fastness and excellent photostability.

The silanic phtalocyaninic dyes of formula (I), since they contain in their molecule silanolic and/or alcoxylic groups hydrolizable to silanolic groups $-Si(OH)_3$, are capable both to autocondense, by reaction between the above indicated silanolic groups, as well as to chemically react with surface hydroxyl groups of suitable inorganic substrates which condense with the hydroxyl groups of the dye thus forming a stable chemical bond (grafting) between the dye and the substrate and giving place to a composite product having pigmentary characteristics.

The composite pigments of this invention are formed by grafting the silanic phtalocyaninic dyes of formula (I) onto an inorganic support.

Particularly suited for the preparation of composite pigments of this invention are the silanic dyes of the formula:

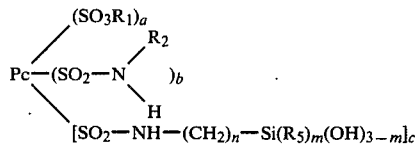

wherein:

Pc is the residue of the phtalocyanine metallized with Cu, Ni or Co;

R₂ is H, methyl, ethyl or propyl;

R₅, R₁, R₂, a, b, c, n and m have the meaning previously given to them.

Examples of suitable inorganic substrates or carriers for combining with dyes of formula (I) to form the composite pigment, are the following: $TiO_2$, in its gel semi-crystalline, rutile or anatase forms also of the commercial type, in which there may be present surface coatings, consisting of mixtures of one or more oxides selected from the group consisting of $SiO_2$, $Al_2O_3$ and $TiO_2$. Additional inorganic substrates or carriers and physical mixes of $TiO_2$ with $SiO_2$ and/or $Al_2O_3$ as well as $SiO_2$ and/or $Al_2O_3$, finely particulated. Because of their superior characteristics preferred the mixed substrates are those of $TiO_2$, $SiO_2$ and/or $Al_2O_3$ obtained by precipitation of $SiO_2$ and/or $Al_2O_3$, as well as alumino-silicates, on crystalline $TiO_2$ particles, prepared according to conventional methods.

Depending on the intended uses, desired degree of hiding power or dyeing power, the above mentioned substrates may be used also in admixture with each other.

The specific surface area of said substrates may vary within a widee range, from 5 to 500 m²/g, but preferably is in the range of 10 and 200 m²/g.

Particularly preferred for their superior characteristics, are the composite dyes containing from 10 to 50% by weight of the silanic phtalocyaninic dye of formula (I) in the grafted form.

The process for the preparation of the composite pigments of the silanic phtalocyaninic dyes of formula (I) grafted on the above said inorganic substrates, comprises treating the selected substrate with a silanic dye (I), in a reaction medium consisting of water and/or inert organic solvents at a temperature between 20° C. and the reflux temperature of the reaction medium, and by then separating by filtering the obtained product, washing it and drying it.

The reaction is carried out in a stretch of time of 2–12 hours, but preferably in a period of time of from 4 to 8 hours, depending on the reaction temperature.

Particularly convenient results are achieved when the composite pigment, separated by filtering, is subjected to a dry thermal treatment in a stove for 4–8 hours at a temperature comprised between 60° and 110° C., before the washing, for instance with water in order to remove the ungrafted silanic dye.

In order to improve the condensation of the dye coating on the substrate, one may operate in the presence of catalysts such as: LiOH, $CF_3COOH$, Pb acetate or cobalt naphtenate.

Further advantages may be achieved if the above mentioned process is carried out in the presence of tetraalcoxysilanes having up to 4 carbon atoms, such as $Si(OCH_3)_4$ or vinyl-trietoxysilane $2HC=CH-Si-(OC_2H_5)_3$, oralkyl-orthotitanates such as $Ti(OC_4H_9)_4$, in amounts ranging from 0,1:1 to about 1:1 by weight with respect to the dye of formula (I), with which they form insoluble copolymers, which are particularly suitable for coating the substrate.

Inert organic solvents which may be used are aliphatic hydrocarbons (n-heptane) and their chlorinated derivatives (tetrachloroethane), alicyclic and aromatic hydrocarbons (benzene, toluene, xylenes, nitrobenzene, chlorobenzenes), the alkyl or aryl ethers and ketones (N-methyl-pyrrolidone, diphenylether), the oxides (dioxane), the amides (dimethylether), the oxides (dioxane), the amides (dimethylformamide), the nitriles (acetonitrile) and the sulphoxides (dimethylsulphoxide).

The preparation process of the present invention enables one to obtain composite pigments which are deeply dyed pigments having a high dyeing power, which are combined with inorganic substrates having low specific surface, such as for instance the highly hiding $TiO_2$.

The composite pigments of this invention may have a composition varying within a wide range, depending on the nature, granulometry and specific surface of the substrate particles, and depending on the dyeing force desired for the pigment.

The granulometric examination of the composite pigment shows that the organic part is essentially distributed on the surface of the inorganic substrate particles.

The X-ray diffractometric examination shows that the particles of the composite pigment have the characteristic crystallinity of the substrate, while the grafted phtalocyanic coating proves to be of an amorphous nature.

The phtalocyaninic pigments of the present invention, thanks to the composite nature achieved through chemical bonds between the silanic organic portion and the inorganic portion are stable to crystallization and do not change the crystalline form even when in contact with aromatic solvents under heat.

Moreover, the solvent-based pigmentary compositions, such as those used for printing inks, do not cause any settling (flocculation) phenomena, not even after prolonged storing.

Thus, the composite pigments of this invention provide an innovating and original solution to the problem of obtaining phtalocyaninic pigments that be stable against crystallization and that are not flocculating.

The above mentioned pigments offer, moreover, excellent pigmentary characteristics, are insoluble in the common organic and aqueous solvents, show excellent fastness characteristics to migration in polyvinylchloride (P.V.C.), to overpainting in alkydic stove enamels and to acids or alkaline treatments. They are pigments of an excellent photostability (light fastness), with a good dyeing power, fastness to heat both when obtained in a transparent form as well as with growing degrees of hiding power.

Thus, said pigments find a selective use in the painting products, in the air drying and oven cured enamels, in the pigmentation of plastic materials such as PVC, polystyrene, polyethylenterephtalate, etc. and in printing inks, with conventional applicative techniques.

The mechanical and/or heat treatments used in the above mentioned conventional techniques, do not modify substantially the pigmentary characteristics of the composite pigments of the present invention.

Said composite pigments offer the substantial advantage of consisting of an inorganic portion or substrate, of low cost and capable of imparting excellent pigmentary characteristics, among which, in particular, the desired degree of hiding power, the excellent resistance to solvents, the stability against crystallization and the non-flocculating character, on which substrate a silanic phtalocyaninic dye, endowed with excellent light fastness, high dyeing power and pure tone is grafted.

The invention will now be described in more detail in the following set of examples, which are given for purely illustrative purposes and shall in no way limit the scope of the present invention.

EXAMPLE 1

A reactor containing 100 ml of chlorosulphonic acid, loaded at room temperature with 10 parts (0.0173 mols) of a 98% copper phtalocyanine, was heated up to 140° C. for 4–5 hours, then cooled down to 70°–80° C., loaded with 9 ml of thionyl chloride and then maintained for 6–7 hrs at a temperature of 70°–80° C.

The reaction mixture thus obtained was drowned in 1150 parts of a water-ice mixture at 0°–5° C., was then filtered and the resulting cake was thereupon washed. There were thus obtained 89.5 parts of a humid cake which under analysis turned out to consist of the chlorosulphonic derivative of the copper phtalocyanine, containing about 3 —$SO_2Cl$ groups and about 1 —$SO_3H$ group per mol of phtalocyanine.

30.6 parts of the cake thus obtained, corresponding to 0.0059 mols of phtalocyanine, were then loaded into a reactor containing 70 ml of pyridine, the cake was then additioned with 3.94 parts (0.0178 mols) of γ-aminopropyltrietoxysilane and then gradually heated up to 60° C. for 3–4 hours, whereafter it was cooled down to room temperature and finally additioned with 300 ml of methanol.

By filtering there was obtained a cake which, washed with water and ethanol, after drying at room temperature, yielded a bluish-green coloured powder which at the analysis gave the following results: C=38.5%,; H=3.8%; N=12%; s=9.5%; Cu=4.9%; Si=6.8% and which corresponded to a product essentially consisting of the silanic dye of the formula:

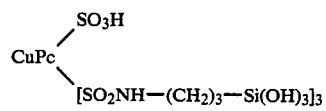

Said dye may be partially present also in a polymeric form through the formation of siloxanic

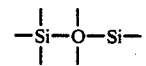

bonds between the silanolic functions —$Si(OH)_3$ present in the molecule.

The dye thus prepared was hardly soluble in neutral or acid water, even under heat, while on the contrary it was soluble in alkaline water giving a green dyeing as well as soluble under heat in dimethylformamide.

Under X-ray examination the dye proved completely amorphous and, formulated in an alkidic stoving enamel, gave a product that in bulk turned out to be coloured green with a heavy blue hue when diluted with $TiO_2$.

Said dye turned out to be suited for the dyeing of natural fibres such as wool and cotton, to which it is applied according to the procedural techniques commonly used for acid or substantive dyes, giving products of a turquoise colour, characterized by good overall fastness and by an excellent light fastness (photostability).

EXAMPLE 2

82.4 parts (0.0155 mols) of an aqueous cake of sulphochlorinated copper phtalocyanine, obtained according to the procedures followed in example 1, were dispersed in 600 parts of water and then additioned, at temperatures below 5° C., with 2,3 parts of $NaHCO_3$ until bringing the pH value to 7. The thus obtained suspension, additioned with 4.29 parts of γ-aminopropyl-trietoxysilane (0.0193 mols) and successively with 1.3 parts (0.0192 mols) of methylamine chlorohydrate, was allowed to react at temperature comprised between 5° C. and 10° C., at a pH equal to 9.5–10.5, maintained by the addition of a 10% NaOH.

The temperature was then allowed to rise spontaneously to room temperature and then to 40° C. where it was maintained for 1–2 hours, after which it was filtered.

The cake thus obtained was meshed in water acidified with HCl, it was then again filtered and dried at room temperature. Thereby was obtained a greenish-blue product which, at the elementary analysis gave the following results: C=42.73% H=3%; N=14%; S=12%; Cu=6.28%; Si=2.68% which corresponded to a product substantially consisting of the silanic dye of the formula:

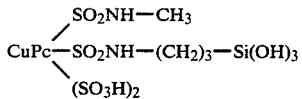

Said dye may be partially in the form of a polymer, analogously with the dye obtained according to example 1.

Its characteristics of solubility and its diffractometric characteristics as well as the overall fastness characteristics of the turquoise coloured products obtained in the stoving enamel applications and in the dyeing of natural fibres, are analogous to those obtained for the dye of example 1.

EXAMPLE 3

10 parts (0.0175 mols) of nickel phtalocyanine were sulphochlorinated with 100 ml of chlorosulphonic acid and 9 ml of thionyl chloride, according to the procedures followed in example 1. Thereby, after filtering and washing, there were obtained 102.5 parts of an aqueous cake consisting of the sulphochlorinated derivative of the nickel phtalocyanine, containing about 3 groups —$SO_2Cl$ and 1 group —$SO_3H$ per mol.

89 parts (0.0152 mols in phtalocyanine) of above said cake, mashed in 300 parts of water together with 3.5 ml of NaOH at a 30% concentration and 5 parts of $NaHCO_3$, were additioned with 3.36 g (0.0152 mols) of γ-aminopropyltrietoxysilane at temperatures comprised between 10° and 20° C.

The basic pH was maintained by the addition of 4 parts of $NaHCO_3$ added in successive portions, then, after 30 minutes, there were admixed 3.09 parts (0.0457 mols) of methylamine chlorohydrate.

This reaction mixture was maintained over night at room temperature, whereafter it was heated at 40° C. for 6 hours, then filtered; the filtration cake was then diluted with water, acidified, again filtered and washed with water and methanol until attaining a neutral pH. After drying at room temperature, there was obtained a deep green coloured powder which at the elementary analysis gave the following results: C=40.3%; H=2.66L %; N=12.88%; S=11.5%; Ni=5.43%; Si=2.9%. to which probably corresponds a product essentially consisting of the silanic dye of the formula:

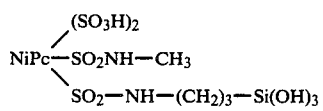

Said dye may be partially in the form of a polymer analogously to the dye obtained according to the procedures of example 1. Under X-ray examination it turned out completely amorphous and, in alkidic stoving enamels and in the dyeing of natural fibres, it provides a green coloured product characterized by good overall fastness.

EXAMPLE 4

There was prepared a composite silanic phtalocyanine pigment using an inorganic mixed substrate of $TiO_2$, $SiO_2$ and $Al_2O_3$, prepared in the following way: 100 pts. of $TiO_2$ were dispersed under mechanical stirring in 1 lt. of water and this dispersion was then heated up to 60° C. After 15 minutes of stirring, there were additioned to it 210 ml of a sodium silicate solution (titre: 365.47 pts/lt of $SiO_2$) and successively there were added, over a period of about 3 hours, about 200 ml of an aluminum sulphate solution (titre: 60 parts/lt of $Al_2O_3$). The additioning was stopped when the pH of the slurry attained the value of 6. The reaction mass was then kept under stirring for 1 hour, after which it was filtered, washed with water in order to remove the soluble salts, and finally was dried at a temperature of 70° C.

The dried product was thereupon crashed and ground in an automatic mortar. There was obtained a white powder (A) which showed the following elementary composition: $TiO_2$+43.4%; $SiO_2$=35.1%; $Al_2O_3$=7.15%; $H_2O$=14.35% and had a specific surface, at the "Sorptometer", of 120 sq.mt/g, a real specific weight of 2.74 g/ml an apparent specific weight of 0.69 g/cc, a porosity of 7.45% and a total porosity of 1.06 ml/g.

The composite silanic phtalocyanine pigment was prepared by introducing 0.75 parts of the dye obtained according to example 1, and 1.75 parts of substrate (A) obtained as indicated above, in a reactor containing 30 ml of dimethylformamide (DMF) and 0.5 parts of water. The reaction mixture was then heated at reflux temperature for 6 hours. Thereupon it was evaporated to ⅓ of its volume, restored with xylene and maintained under reflux for further 2 hours.

After cooling down to room temperature, the mixture was filtered and the cake thus obtained was washed with n-heptane and then treated overnight in an oven at 110° C. After a hot washing with a 50% DMF/xylene mixture and subsequent drying, there was obtained a composite pigment consisting of a powder deeply coloured in green, which under analysis gave the following results: Inorganic ashes=63.44%; C=14.7%; H=2.3%; N=4.63%; Cu=1.7%.

Said powder proved to be particularly fast, even under heat, to treatments with organic solvents or with water. When used in alkidic stoving enamels and in polyvinyl chloride, it gives products of a green colour with blue tones, said products possessing a good dyeing power, and excellent hiding power, an excellent fastness to overpainting and to migration as well as an excellent fastness to light, both when in bulk as well as when diluted with $TiO_2$.

The powdery composite pigment, at the X-ray diffractometric examination, CuK 1.5418 radiation, turned out to consist of particles with a crystallinity characteristical for $TiO_2$ rutile, while no crystalline band of the $SiO_2$, or $Al_2O_3$ and of the phtalocyaninic coating is visible and thus they proved to be amorphous.

EXAMPLE 5

For this example was repeated the preparation of the composite pigment of example 4, but using as medium in the reaction between the dye of example 1 and substrate (A), xylene instead of dimethylformamide and water.

The product thus obtained, at the analysis, showed the following results: Inorganic ashes=62.16%; C=13.95%; H=2.3%; N=4.52%; Cu=1.74%.

The powdery pigment possesses diffractometric, pigmentary, hiding and general fastness characteristics analogous to those of the pigment obtained according to example 4, with a green shade still deeper and brighter.

EXAMPLE 6

0.8 parts of the dye obtained according to ex. 1, were introduced into a reactor together with 70 parts of water, 1 part of $TiO_2$ and 2.1 ml of a sodium silicate solution (titre: in $SiO_2$=365.47 parts/lt.).

The suspension was heated up to 60° C. and, under stirring, was additioned in 3 hours with 2 ml of an aluminum sulphate solution (titre in $Al_2O_3$=60 parts/lt), maintained at 60° C. for one hour and then cooled down to room temperature.

After filtering, the cake thus obtained was washed with water until attaining a neutral pH, then dried in an oven at 110° C. overnight, then repeatedly washed with hot water and finally dried.

In this way there was obtained a green-blue coloured powder, which at the analysis showed the following results: Inorganic ashes=79.18%; C=6.4%; H=1.78%; N=2.11%; Cu=2.19%; while at the X-ray examination showed a crystallinity analogous to that of the pigment obtained in example 4.

When applied to stoving enamels, it gives products with pigmentary characteristics and of general fastness analogous to those of the product of example 4, but of a blue colouring with a green tone and a lesser hiding power.

EXAMPLE 7

0.8 parts of the dye obtained in example 1 were introduced into the reactor together with 70 parts of water, 4.2 ml of a sodium silicate solution (titre in $SiO_2$=365.47 parts/lt).

This suspension was thereupon heated up to 60° C. and, under stirring, was additioned in 3 hours with 4 ml of an aluminum sulphate solution (titre in $Al_2O_3$=60 pts. per liter), maintained at 60° C. for one hour and then cooled down to room temperature.

After filtering, the cake thus obtained was washed with water until attaining a neutral pH, was then dried at 110° C. in an oven overnight, then repeatedly washed with hot water and finally dried.

There was obtained a blue coloured powder of a green tone which, under elementary analysis gave the following results: Inorganic ashes: 76.6%; Cu=0.51%; C=5.55%; H=2.54%; N=1.7%; S=0.98%.

The composite pigment, under X-ray examination, turned out to consist of amorphous particles.

This powdery pigment, in applications in stoving enamels and in polyvinyl chloride, gives products of a blue color with a green tone, perfectly transparent, endowed with excellent fastness characteristics and photostability (light fastness).

EXAMPLE 8

There was repeated the preparation of the composite silanic pigment of example 4, but using the silanic phtalocyanine dye obtained according to example 2 instead of that according to example 1.

There was obtained a blue powder which, under elementary analysis, gave the following results: Inorganic ashes=69.32%; Cu=1.3%; C=12.01%; H=1.8%; N=4.22%; S=2.86%.

Under X-ray examination, the resulting powder showed the same crystallinity as that of the product obtained in example 4.

When used in alkydic stoving enamels and in polyvinyl chloride, it gives products of a pure blue color, with general fastness characteristics similar to those of the product of example 4 and with a good dispersability.

EXAMPLE 9

There was repeated the preparation of the composite silanic pigment of example 7, but using the silanic phtalocyanine dye obtained according to example 2 instead of the dye of example 1.

There was obtained a blue coloured powder which, under analysis gave the following results: Inorganic ashes=64.82%; Cu=1.93%; C=10.7%; H=2.3%; N=3.38%; S=2.83%.

Under X-ray examination, the powder turned out to be constituted of amorphous particles, analogously to the product obtained in example 7.

When used in alkydic stoving enamels, it yields a perfectly transparent product of a blue colour with a shade of green.

EXAMPLE 10

There was repeated the preparation of the composite silanic pigment of example 6, but using the silanic phtalocyanine dye obtained according to example 2 instead of that of example 1.

There was obtained a blue coloured powder which, under analysis, gave the following results: Inorganic ashes=70.35%; Cu=2.69%; C=11.43%; H=1.69%; N=3.59%; S=3.14%.

The thus obtained powder showed, under X-ray examination, crystalline characteristics and general fastness properties, in applications in stoving alkydic enamels and in P.V.C., that are quite analogous to the ones of the product obtained in example 6, but with a blue colour analogously as the product of example 8.

EXAMPLE 11

There was repeated the preparation of the composite silanic pigment of example 10, but using 1.7 ml of a sodium silicate solution instead of 2.1 ml.

There was obtained a blue coloured powder which, under analysis, gave the following results: Inorganic ashes=70.35%; Cu=4.77%; C=10.23%; H=1.1%; N=3.26%; S=2.64%.

The powder, after grinding, when applied to alkydic stoving enamels, yields a blue coloured product having a particular hiding power, an excellent fastness to light and an excellent resistance to overcoating.

EXAMPLE 12

There was repeated the preparation of the composite silanic pigment of example 4, but using the silanic phtalocyanine dye obtained according to example 3 instead of the dye of example 1.

There was obtained a powder deeply coloured in green, which showed pigmentary, hiding power, dyeing power, overall fastness and diffractometric characteristics analogous to those of the pigment of example 4, except a deep green colour in the applications in alkydic enamels and in polyvinylchloride.

EXAMPLE 13

There was repeated the preparation of the composite silanic pigment of example 7, but using the silanic dye of example 3 instead of that of example 1.

There was obtained a transparent composite pigment, deeply coloured in blue with green shade, of good overall fastness.

EXAMPLE 14

One gram of the composite pigment obtained according example 4, suspended in 100 ml of xylene, was heated at the reflux temperature of the solvent for 4 hrs., then cooled down, filtered and finally washed with n-heptane and dried.

The pigment thus treated did not show any variation with respect to the untreated pigment under X-ray examination with regard to the crystallinity, the particle size at the electronic microscope, the tone and the dyeing power in applications in stoving enamels. The pigments proved, thus, particularly stable to crystallization.

On the contrary, a pigment prepared by simple grinding the inorganic substrate (A) of example 4 with an equal quantity of pigmentary copper phtalocyanine of the $\beta$-type free of silanic groups, showed, a variation of the characteristics when subjected to said treatment.

More particularly, it was noted, at the X-ray examination, that there was a variation in the amplitude and intensity of the crystalline bands, due to the growth of the crystals while in the application in stoving enamels there were observed a drastic reduction of the dyeing power and a sensible graying of the shade.

Moreover, a pigment prepared by grinding in the same way as the preceding one, but utilizing a pigmentary phtalocyanine of the $\alpha$-type, when subjected to the above mentioned treatment, under X-ray examination will show a crystallinity different from the initial $\alpha$-type and typical of the $\beta$-type, with a consequential sensible variation in shade in the application in stoving enamels.

EXAMPLE 15 (Applications in PVC)

In a mixer with rotary arms were mixed together at 70° C.:

1.0 parts of a previously ground pigment obtained according to example 4;
100 parts of polyvinyl chloride in a powdery form (PVC);
1.5 parts of calcium stearate with a complexing function and stabilizing action;
3.0 parts of epoxydized soya bean oil;
0.5 parts of lubricant (mixture of glycerides with from $C_{16}$ to $C_{36}$);
2.0 parts of $TiO_2$.

The mixture thus obtained was treated at 180° C. in a three-cylinder refiner, until achieving a complete dispersion of the pigment, in order to obtain a turquoise coloured sheet, with a high hiding power, a good color intensity, a good dyeing power, a good heat resistance and excellent fastness to migration and to light.

EXAMPLE 16 (Application in enamels)

5.0 parts of the pigment obtained according to ex. 4, were mixed together by grinding with 95.0 parts of a fluid vehicle of the following composition:
22% of alkyd resin
19% of melamine resin
59% of xylene.

The homogenization is carried out in a ball mill, by grinding the mixture in the presence of porcelain balls of 10 mm diameter, for the duration of 24 hours.

The enamel thus obtained was applied to the surface to be painted, it was allowed to dry overnight and then was kept in an oven for 30 minutes at 120°–125° C.

There was obtained a painting of a turquoise colour showing an excellent hiding power, an excellent fastness to light and overcoating as well as a good dyeing power. In order to obtain a paint of a lighter shade and of a higher hiding power, 1 part of the enamel obtained as previously above indicated was further diluted with 9 parts of a synthetic white stoving enamel (10% $TiO_2$) of the following composition:
30% alkyd resin,
27% melamine resin,
33% xylene and 10% $TiO_2$.

The homogenization was carried out in a ball mill by grinding the mixture in the presence of porcelain balls of 10 mm diameter, for the duration of 24 hours.

The cut enamel thus obtained was applied to the surface to be painted, it was allowed to dry overnight and was then placed into an oven at 120°–125° for 30 minutes. There was thus obtained a light green varnish with a strong blue shade, with excellent general fastness and a high hiding power.

EXAMPLE 17 (Application in polystyrene)

0.04 g of pigment obtained according to example 4 and preliminarly ground, were added to 100 g of polystyrene (EDISTIR NA, registered MONTEDISON trade mark) that had been previously dried and then calandered for 5 minutes at 160° C.

The coloured material was thereupon cut up and crushed in a toothed wheel crusher. In order to evaluate the tone, dyeing power and thermo stability, there were carried out formings on a CARVER press at 200° C. and 260° C.

There were thus obtained formed pieces of a turquoise colour, with a good hiding power and characterized by a good thermostability and light fastness.

EXAMPLE 18 (Dyeing of cotton)

0.1 g of dye obtained according to example 1, were dissolved in 200 ml of hot water. The dissolution of the dye was promoted by bringing the solution to a pH equal to 9 by the addition of $Na_2CO_3$. To the solution were then added 2 grams of techanical sodium sulphate and the whole was brought up to 60° C.

Into said solution there was immersed 5 g of a cotton fabric and the dyeing was started in a AHIBA mod. Texomat apparatus, bringing the temperature in 30 minutes up to 95° C. and maintaining same for 1 hour. The fabric was then abundantly rinsed in water at room temperature and finally dried.

There was obtained a blue-turpuoise coloured fabric with good overall fastness characteristics and excellent photostability.

EXAMPLE 19 (Dyeing of wool)

0.1 g of dye obtained according to example 1, were dissolved in 200 ml of hot water.

To this solution there were then added 0.5 g of sodium sulphate and 0.2 ml of a 50% acetic acid, until attaining a pH of 4.5.

Into this solution, heated up to 60° C., were then immersed 5 g of a woollen fabric. The dyeing was carried out in a AHIBA Mod. Texomat apparatus, bringing the temperature up to 90° C. in 30 min. and the pH to 4 by means of acetic acid, and by then maintaining these conditions for 30 minutes.

The fabric, after an abundant rinsing with water at room temperature and a subsequent drying, displayed a blue-turquoise colour and was characterized by good overall fastness and an excellent photostability.

We claim:

1. Composite silanic pigments consisting of the silanic phtalocyamine dyes containing at least one silanic group having the formula:

$$Pc \begin{cases} (SO_3R_1)_a \\ (SO_2N\begin{smallmatrix}R_2\\R_3\end{smallmatrix})_b \\ [SO_2-NH-(CH_2)_n-\underset{\underset{(R_4)_q}{|}}{Si}-(R_5)_m(OH)_{p-m}]_c \end{cases}$$

wherein:
Pc is the residue of the phtalocyanine which may be metallized with a metal selected from the group consisting of Co, Ni and Cu;
$R_1$ is selected from the group consisting of a hydrogen atom or an alkaline metal;
$R_2$ and $R_3$, either equal to or different from each other, are selected from the group consisting of H, alkyls having up to 4 carbon atoms, cycloalkylis and aryls;
$R_4$ is selected from the group consisting of a $C_1$-$C_4$ alkyl and a phenyl;
$R_5$ is a $C_1$-$C_4$ alcoxyl;

n is 3, 4 or 5; q is 0, 1; p and m are such integers that when q=0, p is 3 and m is 0, 1, 2, 3, and when q is 1 p is 2 and m is 0, 1, 2;
a and c are numbers in the range of 1 to 3 and b is a number in the range of 0 and 2, chosen in such a way that the sum $a+b+c \leq 4$; and wherein each of the four benzenic rings of the phtalocyanine is bound to only one single sulphonic ($-SO_3R_1$) or sulphonamidic group, grafted on an inorganic support selected from the group consisting of $TiO_2$ with $SiO_2$ and/or $Al_2O_3$, $SiO_2$ and/or $Al_2O_3$ finely comminuted, having a specific surface comprised between 5 and 500 sq.mt/g.

2. Composite silanic pigments consisting of the silanic phtalocyamine dyes containing at least one silanic group having the formula:

$$Pc \begin{cases} (SO_3R_1)_a \\ (SO_2-N\begin{smallmatrix}R_2\\H\end{smallmatrix})_b \\ [SO_2-NH-(CH_2)_n-Si-(R_5)_m(OH)_{3-m}]_c \end{cases}$$

wherein:
Pc is the residue of the phtalocyanine metallized with a metal selected from the group consisting of Cu, Ni and Co;
$R_2$ is H, methyl, ethyl, propyl;
$R_5$, $R_1$, $R_2$, and a, b, c, n and m have the meanings given to them in claim 1, grafted on an inorganic support selected from the group consisting of $TiO_2$ with $SiO_2$ and/or $Al_2O_3$, $SiO_2$ and/or $Al_2O_3$ finely comminuted, having a specific surface comprised between 5 and 500 sq.mt/g.

3. A composite pigment according to claim 1 or 2 wherein the specific surface is in the range of 10 and 200 sq.mt/g.

4. Composite pigments according to claim 1 or 2 containing from 10 to 50% by weight of the silanic dye of formula (I) in a grafted form.

5. Process for preparing the composite silanic pigments according to claim 1 or 2, characterized in that the inorganic support is made to react with a phtalocyanine dye of formula (I) in a reaction medium consisting of water and/or inert organic solvents, at a temperature comprised between 20° C. and the reflux temperature of the reaction medium, in then separating the pigment by filtering and subsequent washing and by finally drying the pigment.

6. Process according to claim 5, characterized in that the composite pigment, separated by filtering, is subject to a dry thermal treatment in an oven at 60°-110° C. for 4-8 hours before the washing.

7. Process according to claim 5, characterized in that the reaction is conducted in the presence of catalysts selected from the group consisting of LiOH, $CF_3COOH$, lead acetate and cobalt naphtenate.

8. Process according to claim 5, characterized in that the reaction is carried out in the presence of a compound selected from the group consisting of tetraalcoxysilanes containing up to 4 carbon atoms, vinyltrietoxysilane and the alkylorthotitanates, according to a ratio by weight with respect to dye (I) comprised between 0.1:1 and 1:1.

9. Plastic materials, varnishes, stoving enamels, inks, printing pastes for fabrics when dyed with the composite silanic pigments as claimed in claim 1 or 3.

* * * * *